United States Patent [19]
Van Huisen

[11] 3,765,477
[45] Oct. 16, 1973

[54] GEOTHERMAL-NUCLEAR ENERGY RELEASE AND RECOVERY SYSTEM

[76] Inventor: Allen T. Van Huisen, 29456 Indian Valley Rd., Rolling Hill Estates, Calif. 90274

[22] Filed: Dec. 21, 1970

[21] Appl. No.: 99,898

[52] U.S. Cl. .................................. 165/45, 166/247
[51] Int. Cl. ............................................. F28d 21/00
[58] Field of Search .................. 165/1, 45; 166/247, 166/258

[56] References Cited
UNITED STATES PATENTS
3,294,167 12/1966 Vogel.................................. 165/258
3,470,943 10/1969 Van Huisen.......................... 165/45

OTHER PUBLICATIONS
"Non Military Uses of Nuclear Explosives" – Scientific American Dec. 1958 Vol. 199 No. 6 pp. 29–35.

Primary Examiner—Charles Sukalo
Attorney—Marvin E. Jacobs

[57] ABSTRACT

A system for mining geothermal energy utilizing the detonation of a deeply buried nuclear device such as nuclear fusion bomb or a nuclear fission bomb to produce a chimney cavity and fractures in a rocky geothermal stratum. Heat exchange fluid is introduced into the cavity and is transferred to flood a higher permeable stratum closer to the surface of the earth. Heat exchangers are introduced into the flooded zone to transfer heat and energy to the surface for utilization.

11 Claims, 3 Drawing Figures

GEOTHERMAL-NUCLEAR ENERGY RELEASE AND RECOVERY SYSTEM

BACKGROUND OF THE INVENTION

1. Field of the Invention

The present invention relates to utilization of geothermal energy, and more particularly, to a system employing deep detonation of nuclear devices to produce large cavities and fractures for use as geothermal producing zones.

2. Description of the Prior Art

The earth's geothermal gradient coupled with the specific heat of the average sedimentary rock demonstrates that there is a vast amount of heat energy flowing both towards and parallel to the surface of the earth through the upper few miles of the earth's crust. The source of heat in the upper few miles of the earth's crust may be from the outward flow of heat from the core of the earth, from the cooling igneous magmas, from the disintegration of radioactive elements, from the frictional heat formed during diastrophism, (the rubbing together of individual grains), and from the exothermal chemical reactions that take place within permeable reservoir rocks.

The mean heat flow from the interior of the earth to the surface of the earth in continental North America averages approximately $1.2 \times 10^{-6}$ calorie per centimeter per second. Zones or areas with much higher heat flow are known. A zone approximately 50 to 100 miles wide and several thousand miles long extends from Easter Island in the Pacific into the Gulf of California and on into the southern part of the United States, where the heat flow is 5 to 8 times normal. Substantial areas of the world are underlayed by rocks of abnormally high temperatures. In many places heat flow in these regions is as much as 10 times that of the normal crust.

The average heat flow indicates a temperature gradient in a geological region of average rock type of approximately 1° C per 100 feet of depth. In areas of abnormally high heat flow, the temperature gradient may be as much as 10° C per 100 feet of depth, or more. In areas of hot spring activity or recent volcanic activity, substantially higher temperature gradients may be found over extensive areas. In many regions, temperatures of as much as 500° C may be found at depths of 10,000 feet or shallower. A substantial amount of energy is stored in such a volume of hot rock.

In many areas of the earth, deep circulating water is at depths as deep as 10,000 feet or more. The rising heated water carries this heat to shallow depths, heating large volumes of rock. Enormous amounts of energy are contained in these masses of heated rock which in some cases total many cubic miles. The total heat energy in one cubic mile of rock at 10,000 feet depth may be equivalent in energy to 300 million barrels of oil. However, most of the deep magmatic bodies are not contacted by deep circulating underground water sources which are essential to raise the heat to shallower strata from which it can be economically recovered.

Such natural systems in which geothermal reservoirs are in contact with a source of underground water to create geothermal regions with potentially recoverable heat values are relatively restricted by the low heat conductivity of the rock and the lack of deep circulating waters. Furthermore, there are very few economical geothermal wells in production.

Present utilization of geothermal energy relies on direct thermal fluid mining methods. Geothermally produced gas must be at a sufficient pressure to allow sustained production from the well and the gas must contain sufficient energy to drive a prime mover, such as a turbine. Geothermal hot brine must be at a temperature sufficiently higher to permit flashing of the water into steam, which after separation, can drive a steam engine. The remaining brine may be economically convertible into usable commercial salts. The gas, or separated steam, must not contain an undue amount of corrosive salts or gas such as ammonia or hydrogen sulfide, and the waste water and brines must be disposable without polluting surface or potable waters. Furthermore, cavitation, abrasion, scaling and corrosion of equipment must not occur over too short an interval. Moreover, fluid sources of geothermal energy are only available in quite limited parts of the earth and are thus not generally available for heat or energy utilization.

Geothermal reservoirs which lack fluid can only transmit heat by conduction. Furthermore, many geological strata are too impermeable to permit adequate invasion of a heat transfer fluid through the hot geothermal strata in order to mine and recover the heat values through wells drilled into the strata. The conductivity to heat is very low in non-porous strata, whereas, the capacity to transmit heat is higher in beds with higher permeablity or in wet geothermal areas as is experienced in conventional geothermal steam producing areas. However, a heavily fractured and cavernous formation is practically a true boiler in which the resistance to movement of heat is reduced.

There have been recent proposals to utilize energy released by the underground explosion of a nuclear device or to utilize the combined geothermal and nuclear energy conserved within the chimney formed by the explosion. In one proposal, a nuclear device is introduced into a pre-formed cavity in an isolated, sub-terranian, compact, competent, geological formation, such as a salt formation, and it is then actuated. The energy liberated by the detonation is retained within the zone and water is then introduced into the zone and directly transferred to the surface for utilization. In another proposal, a detonation occurs in a hot geothermal strata to form a heavily fractured and cavernous formation containing large amounts of porous rubble which functions as a true boiler. Again water is introduced into the chamber to convert it to heated water or steam which is directly piped to the surface.

It has been demonstrated that nuclear fusion or fission devices can be detonated underground in competent geological strata in which the weight of the earth will serve to contain the explosion. The explosion will fracture and cavitate a substantial area of the adjacent rock to form a rubble cone pro-tecting both the heat source from the detonation and from the fractured geothermal rock. Such detonations are attendent with many difficulties.

One of the dangers relates to the distribution of radioisotopes within the cavernous and fractured area after the explosion which can contaminate the introduced heat exchange fluid. Without special precautions, such radioactive elements are a hazard to the surface areas where the heat exchange fluid is utilized. Radioactive shielding and control devices are both expensive and the devices are of limited reliability. This greatly adds to the cost of mining and utilization and precludes the selection of such a system as a pollution-free, low cost source of energy. Another problem is that the cost of detonation is very high and the area of use is limited to adjacent the detonation site. Therefore, the final cost of energy may not be economical or of such great cost that only a very large user could consider such an investment.

SUMMARY OF THE INVENTION

In accordance with this invention, the geothermal heat energy and the energy released by a nuclear explosion are more efficiently and economically recovered without the need to transport radioactively contaminated fluids to the surface of the earth. Furthermore, the invention permits distribution and utilization of the geothermal energy over a wide area by both small users and by industrial users. Geothermal strata containing substantial heat energy, but lacking moisture and permeability, are rendered usable to substantially contribute to energy requirements now being satisfied mainly by fossil fuels.

The geothermal-nuclear energy distribution system in accordance with the invention, includes a cavity formed in a hot geothermal strata by means of a nuclear detonation, means for introducing a heat exchange fluid to the cavity to transfer the geothermal and heat energy generated by the nuclear device to the fluid, means for transporting the heated fluid to a higher porous sub-surface zone for flooding and heating the zone; and heat exchange means having a closed end inserted into the flooded porous strata and having an open end and means communicating said open end with the surface of the earth for indirectly delivering said geothermal heat to the surface for utilization.

To recover the geothermal energy from the deep hot strata, a nuclear device is introduced into the strata and detonated to form a fluid permeable cavity. A heat exchange injection well is drilled into the cavity from the surface and a heat exchange transfer well is drilled from the cavity to a higher permeable zone. The permeable zone is flooded with heat exchange fluid from the transfer well. Heat recovery wells are then drilled from the surface into the flooded zone and closed end heat exchangers implanted at the bottom of the heating wells for indirect recovery of geothermal energy.

The invention will now become better understood by reference to the following detailed description when considered in conjunction with the accompanying drawings.

DESCRIPTION OF THE PREFERRED EMBODIMENTS

Figure 1:
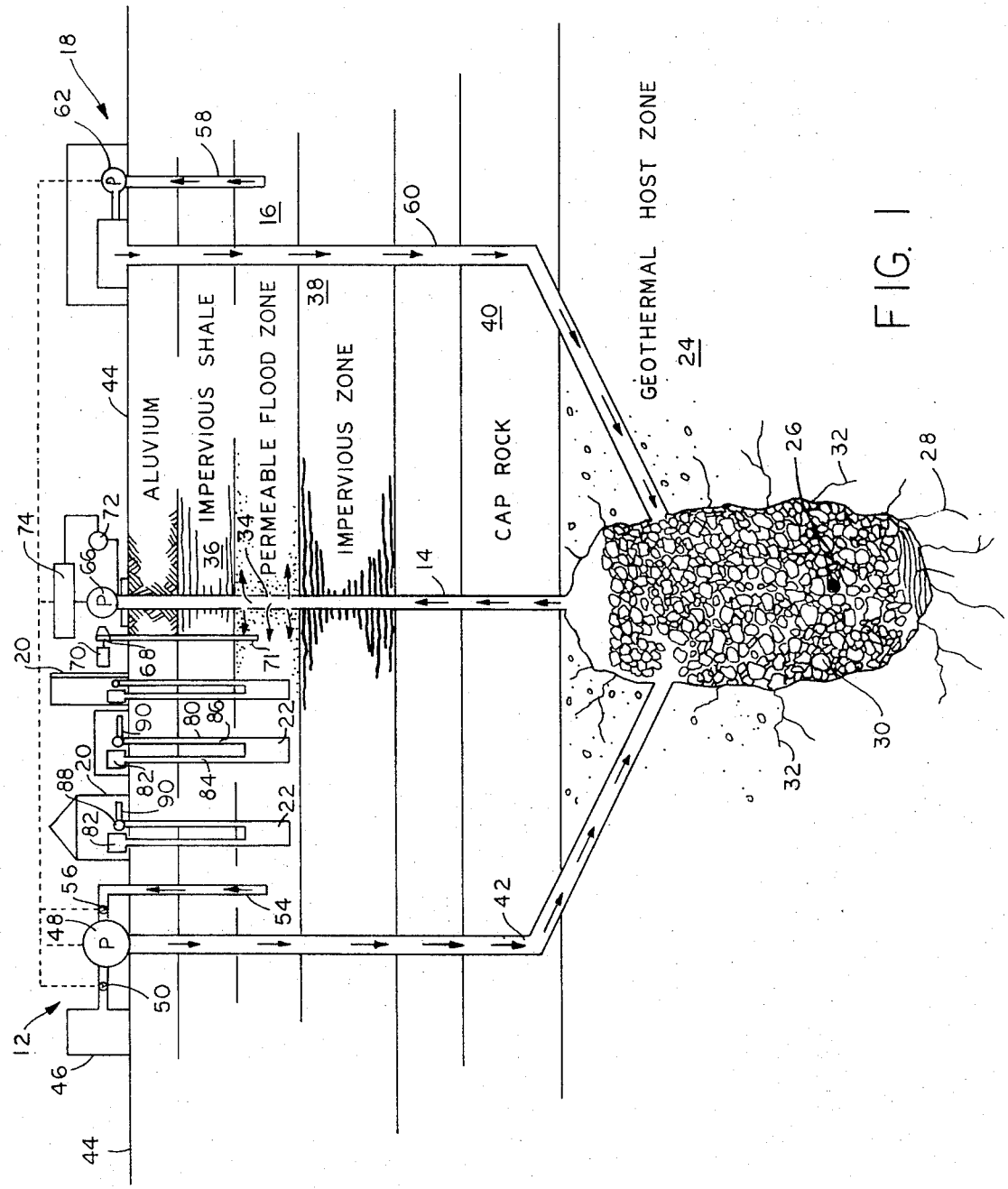
FIG. 1 is a schematic view of a system for recovery and distribution of geothermal-nuclear heat energy.

Referring now to FIG. 1, the system according to the invention includes a nuclear produced cavity 10, a heat exchange fluid injection system 12 for introducing heat exchange fluid into the cavity 10, a heat exchange transporting conduit 14 for transporting the fluid to a near-surface permeable zone 16, and optionally, a recirculation system 18 for removal of fluid from zone 16 and returning to cavity 10. Structures 20 overlying the zone 16 flooded with the heat exchange fluid may tap into the zone 16 with a closed end heat exchanger 22.

The cavity 10 is formed in a geothermal heat host zone 24 having a mean temperature of at least 200° C and preferably, from about 500° to 800° C. The composition of the host zone should be selected with a view to forming a highly permeable rubble cone. A nuclear detonation in a salt, limestone or shale formation would be expected to result in substantial compaction of the rubble after formation and some loss of permeability through the rubble cone with time. However, if the nuclear shot were made in basalts, metamorphic rocks or granite-rock type in a region of high heat flow, one can expect the rubble cone to stay open and permeable for almost indefinite periods. The latter rock types are common in regions of high heat flow. Another usually coincident geological condition is the presence of a cap rock strata above the hot geothermal layer.

This is important since the detonation must be contained to avoid escape of radioactive gases, to contain the thermal energy produced by the nuclear blast and furthermore, to prevent collapse and caving at the surface of the earth. Containment is achieved if the internal cavity pressure is equal to or less than the overburden or lithostatic pressure at the time the shock front wave has been reflected from the surface back to the cavity wall. Experience to date indicates that hard rock layers support the detonation without significantly increased ground support problems. Furthermore, available experimental data from the "Plowshare" program permits the prediction of cavity size, chimney height and tonnage of broken rock for underground nuclear explosions with considerable confidence.

For a specified rock type, predicted accuracy is within 10 percent. Criteria for establishing minimum depths of burial to prevent dynamic venting have also been established. For explosions in hard rock, such dynamic venting can be prevented by a depth of burial equal to the anticipated chimney height plus a 300 to 500 foot thick buffer of overlying rock cover.

The cavity 10 is produced by drilling a hole to implant the nuclear device at a shot point 26 in the geothermal host zone 24. The device is detonated to produce the cavity 10 by the expansion of the explosion produced gases. The lower cavity boundary is characterized by a melt rock interface 28, while the cavity fills with a chimney of broken rock 30, resulting from gravity collapse of the cavity. A zone of fractured rock 32 immediately surrounds the chimney.

A 5-megaton shot detonated at a depth of 10,000 feet in rock having a geothermal temperature of approximately 500° C can be expected to produce a cavity approximately 500 feet in radius. This cavity will have a volume of approximately $5 \times 10^8$ cu. ft. The cavity will collapse in a few seconds after its formation and a rubble cone extending upwardly towards the surface of the earth is formed by successive caving actions. If the porosity of the rubble is approximately 12 percent, a volume of rubble in the cone equal to approximately eight times the volume of the cavity will be formed. This rubble cone will extend upward to approximately 2,000 feet from the surface of the earth. There will be approximately $4 \times 10^9$ cu. ft. of rubble in the cone and the mean temperature of the rubble will be approximately 350° C.

Water introduced into the stop of the rubble cone should flash immediately to steam. The specific gravity of the rock can be assumed to be about 2.5 and its specific heat to be about 0.25. At temperatures above 100° C, approximately $4.5 \times 10^6$ calories are available from each cubic foot of rock. Thus, there are $1.8 \times 10^{16}$ calories of energy available in such a rubble cone. This contrasts with the heat liberated by the explosive which is approximately $5 \times 10^{15}$ calories. In summary, the amount of heat available is approximately five times the energy of the explosive, and this heat can be produced at a constant controlled rate simply by the controlled injection of water into the recovery cone. Approximately $10^{11}$ pounds of super-heated steam can be produced from the energy of the rubble.

The cost of drilling a 30 inch diameter hole to 10,000 feet is estimated to be not in excess of 4 million dollars. The service charge of the device to be detonated will be approximately 1 million dollars. Thus, it appears that the cavity will be economic by a factor of at least 2.

The geological formation selected for the detonation in addition to having a competent lower geothermal host zone 24 also has a geologically competent upper geological stratum 16. The upper formation 16 is a stratum which is selected to have a geological capacity to receive the thermal flood which occurs when the fluid heated in the lower fractured formation is delivered to it. The hot fluid, or steam, leaves the cavity 10 by means of the heat exchange transporting conduit 14. The conduit 14 may be located in the drill site utilized to implant the nuclear device. The heat exchange conduit 14 contains perforations 34 in the portion traversing the permeable flood zone 16. The heated fluid permeates through and floods the zone 16, and is capable of maintaining the zone at a temperature of at least 100° C, preferably at least 150° C. The conduit 14 should be cased with a low thermal conductivity material to prevent heat losses as the fluid is raised to the zone 16.

The permeable flood zone 16 should be disposed between two impermeable geological zones to restrict and contain the transferred heat exchange fluid. The overlying zone 36 can be an impermeable shale rock. The underlying zone 38 may be formed of some other impermeable geological strata. The zone 16 should be located a minimum distance from the surface, suitably about 200 to 500 feet, so that the cost to the individual user of drilling a well for implanting a heat exchanger 22 within the zone is at a minimum cost. Depleted oil and gas fields usually have competent properties for a permeable flood zone and could be used for the heat flood storage zone when they are in the proximity of utilization.

A second bore hole or well 42, is drilled from the surface 44 of the ground into the cavity 10 at a location near the top of the rubble 30 for injection of heat exchange fluid, suitably water, into the cavity. The heat exchange fluid is introduced in a controlled manner from a water storage tank 46 by means of pump 48 when valve 50 is opened. The bore hole 42 is preferably located a distance away from the cavity 10 so that pump 48 can also be used to pump the heated exchange fluid out of the zone 16 through a stand-by heat exchange recovery well 54 when valve 56 is open. The heat exchange fluid is then re-injected into the rubble cone through the injection well 42. A second recovery well 58 may be drilled into the permeable heat flood zone 16 on the other side of transfer conduit 14. A second recirculation well 60 may be drilled from the surface 44 near the recirculation well 58, having a lower end communicating with the zone 10 near the top of the rubble 30. On actuation of pump 62, the heat exchange fluid will be drawn out of the zone 16, through withdrawal well 58 and re-injected into the rubble cone 10 through recirculation well 60.

Thus, the natural convection movement of the heat exchange fluid upward through pipe 14 and relatively outward through the perforations 34 into the zone 16 is materially aided by activation of pumps 48 and 62 to withdraw the heat fluid from the formation 16 through the recovery wells 54 and 58. The resultant movement of the heat exchange fluid in the formation 16 greatly increases the efficiency of the heat exchange with the heat exchangers 22 submerged therein. The recovery and reinjection operations can be activated during times of peak energy demand. During minimum demand periods, excess heat exchange fluid may be transported through transfer conduit 14 to the surface either naturally by convection or aided by means of a pump 66. The heat exchange fluid can be utilized during these minimum demand periods to operate a turbine 68 and electric generator 70 or other suitable uses. The condensate from the turbine 68 can be returned to the formation 16 by means of a recycle well 71.

The quality and quantity of the heat exchange fluid being generated at any instant can be sensed at the top of well 14 by means of a gauge 72. The signal, from the gauge 72 can be applied to a controller 74 which can operate and actuate the various valves 50 and 56 and the pumps 48, 66 and 62.

Each of the deep wells 42, 14 and 60 are provided with suitable pressure-control means, fluid monitoring means and such other equipment that is necessary to insure the efficient and trouble free operation of the wells for the intended purpose. The withdrawal and re-injection of fluid from the flood stratum 16 in addition to providing movement of the fluid through the flood zone and improving heat exchange efficiency also prevents saturation of the flood zone with the liquid. The location of the recycle wells at the periphery of the intended boundary of utilization also can be utilized to scavenge the fluid and return it to the lower cavity and thus prevent permeation and waste of the heat exchange fluid through extended areas not intended to be utilized for heat or energy exchange purposes.

The flooded zone 16 acts as a storage zone for the energy injected into it via the circulation of heated water and/or steam. The storing of heat energy upon the surface of the earth is both difficult and expensive. The present invention permits the transfer of geothermal heat energy from a deep strata into a higher storage subsurface zone where it is absorbed into the formation and retained for future use. Furthermore, the system according to this invention permits the utilization of the geothermal energy in the vicinity of the mining area without requiring the transportation of the fuel over substantial distances.

Thus, enormous amounts of energy are available close to the surface for economical recovery and utilization. An owner of a surface structure 20 may simply drill a heat well 80 into the permeable flooded stratum 16 and insert a closed-end heat exchanger 22 at the bottom thereof. The radiant heat may be piped to the surface through the well 80 but preferably boiler grade water is fed by gravity from storage reservoir 82 into the heat exchanger 22 by means of pipe 84 and steam is returned to the surface through conduit 86 preferably assisted by means of pump 88 which also pumps the steam into the distribution system 90 for heating the space enclosed by building 20. The heat well 80 and heat exchanger 22 may be constructed and operated according to my previous U.S. Pat. No. 3,470,943 entitled "Geothermal Exchange System." A series of heat exchange wells 80 and heat exchangers 22 may also be utilized to provide the energy for the heat irrigation system disclosed in my previous U.S. Pat. No. 3,521,699, entitled "Earth Energy Conservation Process and System."

Figure 2:
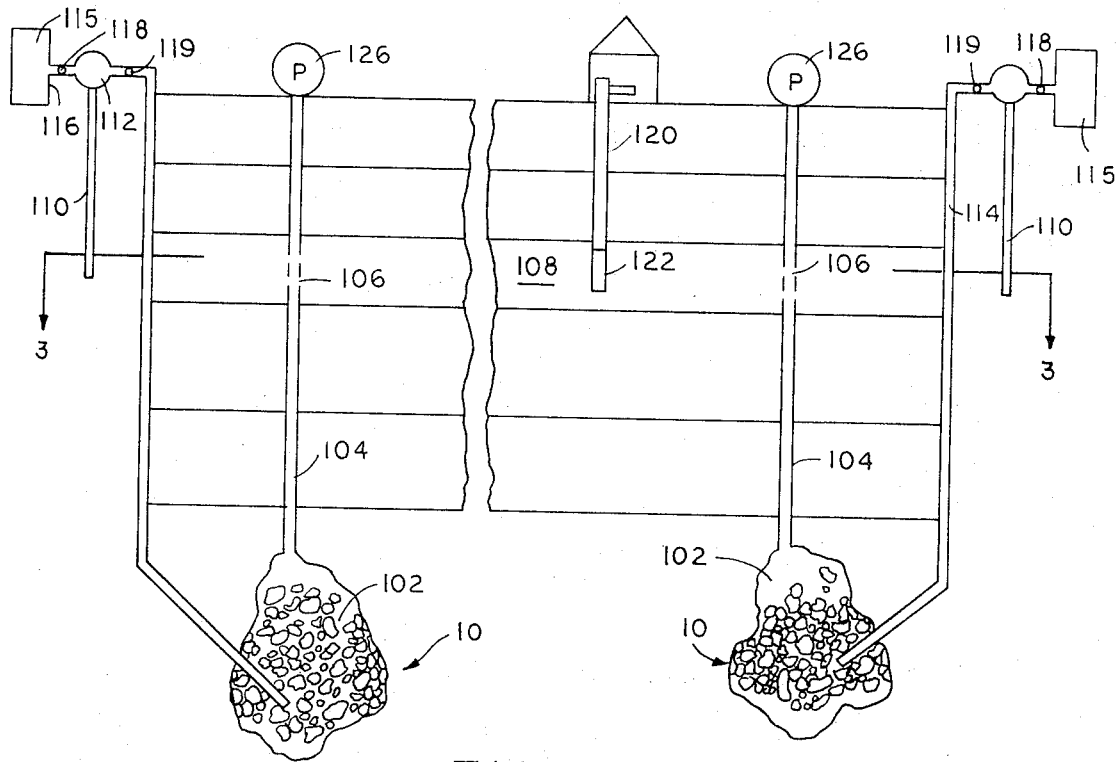
FIG. 2 is a schematic view illustrating the application of the invention to distribution of the energy over a large area such as a city for tapping by many users.
Figure 3:
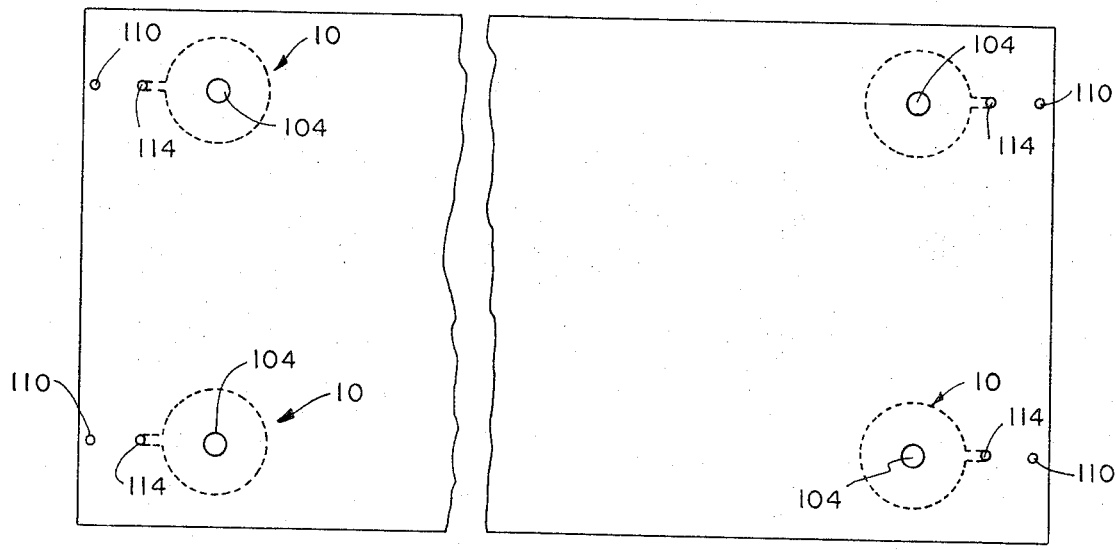
FIG. 3 is a section taken along line 3—3 of FIG. 2.

The geothermal-nuclear energy release system can be expanded in operational scope so as to be able to flood large areas serving communities and cities. Referring now to FIGS. 2 and 3, a plurality of nuclear detonated cavities are created in a pattern underneath the city 100. In a city of the size of 30,000 to 60,000 population, it is estimated that four rubble cones 102 provided at each corner of the city would have sufficient capacity to flood the zone 16 and provide sufficient heat for space heating and energy requirements for the city. Each cavity 10, is provided with a heat transfer conduit 104 having perforations 106 within the permeable zone 108. A withdrawal well 110, pump 112 and recycle well 114, is associated with each cavity 10. Each pump 112 may also be connected to a reservoir of feed water 115 through a line 116 containing a valve 118.

The rubble cones 102 are prepared by nuclear detonation as described above, and, the recirculation wells 114 are then drilled into the cavities 102. The withdrawal wells 110 are then drilled into the porous formation 108 and the pump 112 is connected to the withdrawal well 110 and the recycle well 114 at each corner of the city. Feed water 115 is introduced to the rubble cones through the recycle well 114 with valve 118 open. Hot water and steam are generated and percolate upward by natural convection or aided by means of pump 126 through the main well 104 and out perforations 106 and into the layer 108. The withdrawal wells 110 maintain the fluid moving through the thermally flooded permeable layer 108 when valve 119 is open and valve 118 is closed. Ground users such as home owners, business owners and municipal users may simply tap and utilize the thermal energy within zone 108 by drilling heat wells 120 from the surface into the heat flooded zone and installing a closed bottom heat exchanger 122 at the end of the heat well 120. It is predicted that the amortization of the installation for such a community system will be at such a low rate, that users may be charged a fixed fee for tapping into the zone to heat their house rather than requiring metering and charge by BTU or calorie unit.

The thermal energy system of the invention will conserve conventional energy and fossil fuels and will obviate the need to burn pollution producing for energy production fuels near large population centers. The system of the invention prevents radiation hazard since the heat is mined by indirect heat exchange. Economic feasibility is clearly indicated based upon available data on heat energy sales and the cost of steam production.

The present invention when practiced in competent geological formations to provide containment of the explosion permits economically tapping the heat energy released into the cavity by the explosion and the continuously transferring and storing the energy in a higher permeable flood zone.

It is to be realized that only preferred embodiments of the invention have been disclosed and that numerous substitutions, alterations and modifications may be readily made by those skilled in the art without departing from the spirit and scope of the invention as defined in the following claims.

What is claimed is:

1. A goethermal-nuclear energy recovery and distribution system comprising in combination:
   a fractured, highly permeable, rubble cone cavity formed in a geothermal strate having high heat flow and a mean temperature of at least 200° C by the detonation of a nuclear device within the cavity;
   a cap rock strate disposed above the cavity to contain radioactive gases and thermal energy and to prevent collapse and caving at the surface of the earth;
   injection well means extending from the surface of the earth to the cavity for introducing heat exchange fluid into the cavity and to transfer the geothermal and heat energy generated by the nuclear device to the fluid;
   transfer well means extending from the cavity through the cap rock strata to a higher, fluid permeable, sub-surface zone for flooding and heating the zone with the heated fluid;
   an upper and lower impermeable geological zone disposed above and below the heat flooded zone to restrict and contain the transferred heat exchange fluid within the flooded zone;
   heat recovery well means extending from the surface into the flooded zone;
   heat exchanger means having a closed end received within the terminus of the recovery well and extending into the heat flooded, permeable zone; and
   means for delivering a second heat exchange fluid to the heat exchanger and for conducting the heated second fluid to the surface of the earth for utilization.

2. A system according to claim 1 in which said sub-surface permeable zone is no deeper than 500 feet from the surface and further including means for circulating heated fluid through said permeable sub-surface zone.

3. A system according to claim 2 in which the circulating means includes a plurality of said cavities disposed at spaced points underlying a surface community, each of said cavities being provided with an injection well and a transfer well.

4. A system according to claim 2 in which said circulating means comprised at least one withdrawal well extending from the surface into the permeable subsurface zone for withdrawing fluid therefrom and at least one reinjection well extending from the surface into the cavity for receiving the withdrawn fluid and for reinjecting the withdrawn fluid into the cavity.

5. A system according to claim 1 in which the geothermal strata has a mean temperature of from 500° C to 800° C and the strata is formed of a material selected from basalt, metamorphic and granite rock types.

6. A system according to claim 1 further including pump means associated with said well means.

7. A system according to claim 6 further including heat sensing means for sensing the heat content within the flooded subsurface permeable zone and for developing a signal indicative thereof and control means connected to said sensing means for selectively actuating said pump means.

8. A system according to claim 4 including a plurality of withdrawal wells located near the periphery of the boundary of surface utilization and reinjection wells connected to said withdrawal wells for reinjecting the heated heat exchange fluid into the cavity.

9. A system according to claim 1 in which the transfer well means is lined with an impermeable conduit extending from said cavity at least to said fluid permeable zone and said conduit contains perforations adjacent said permeable zone.

10. A system according to claim 9 in which the conduit is lined with low thermal conductivity material.

11. A system according to claim 1 in which the outlet of said injection well means into said cavity is located near the top of the cavity.

* * * * *

UNITED STATES PATENT OFFICE
CERTIFICATE OF CORRECTION

Patent No. 3,765,477          Dated October 16, 1973

Inventor(s) Allen T. Van Huisen

It is certified that error appears in the above-identified patent and that said Letters Patent are hereby corrected as shown below:

Column 2, line 30, "permeablity" should read --permeability-- line 57, "pro-tecting" should be --protecting--. Column 8, line 14, "goethermal" should read --geothermal--; line 17, "strate" should read --strata--; line 20, "strate" should read --strata--.

Signed and sealed this 26th day of March 1974.

(SEAL)
Attest:

EDWARD M. FLETCHER, JR.
Attesting Officer

C. MARSHALL DANN
Commissioner of Patents